Patented June 2, 1931

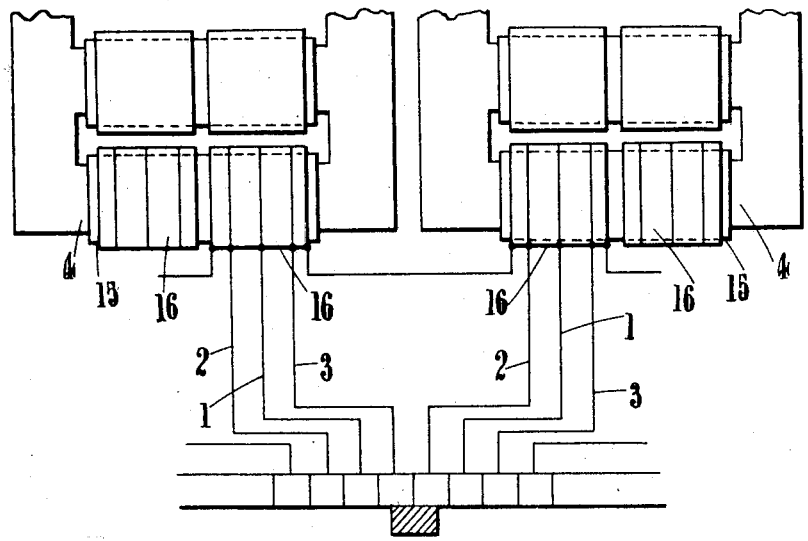
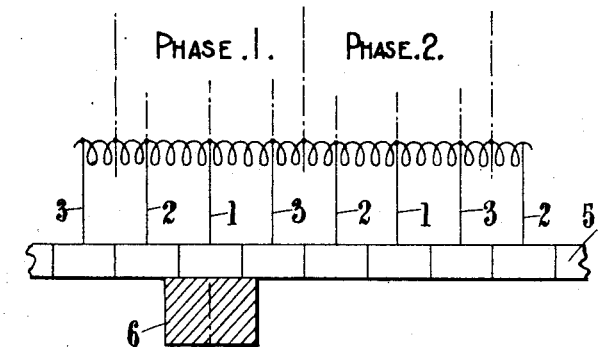
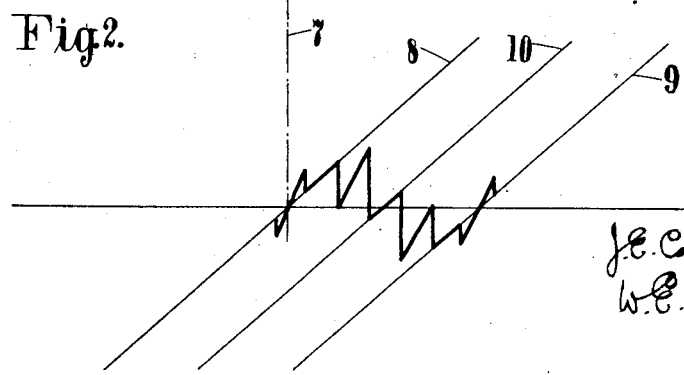

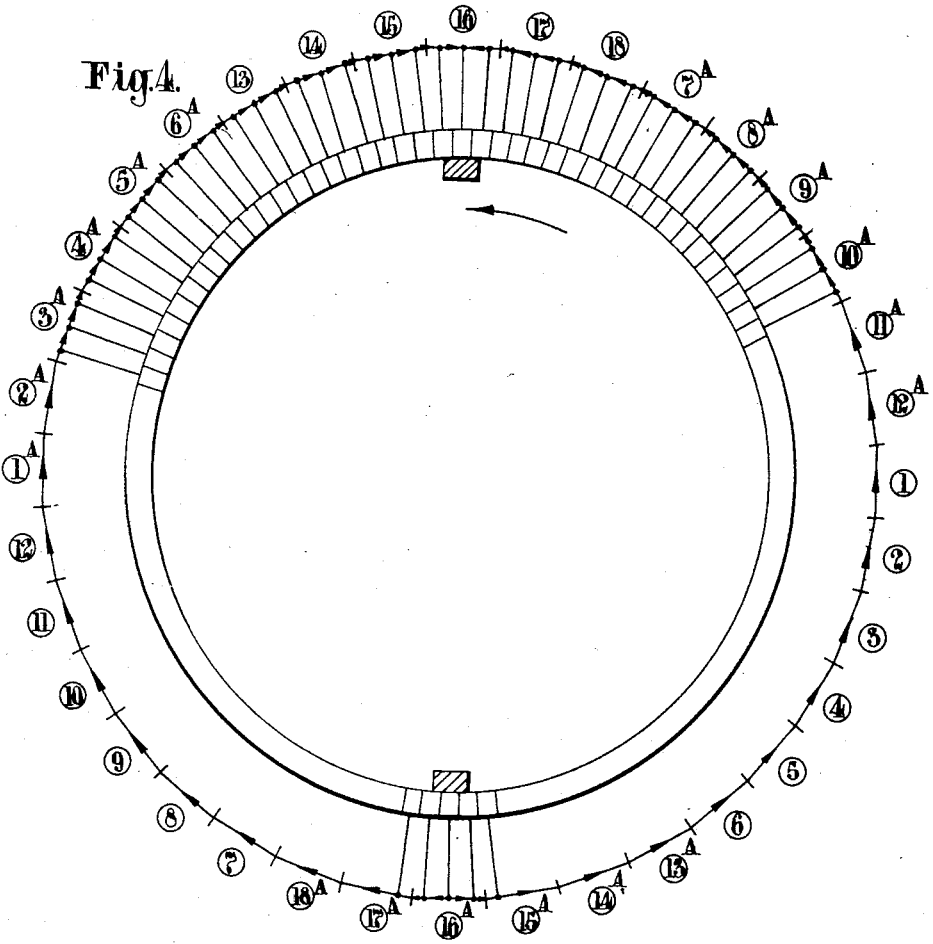
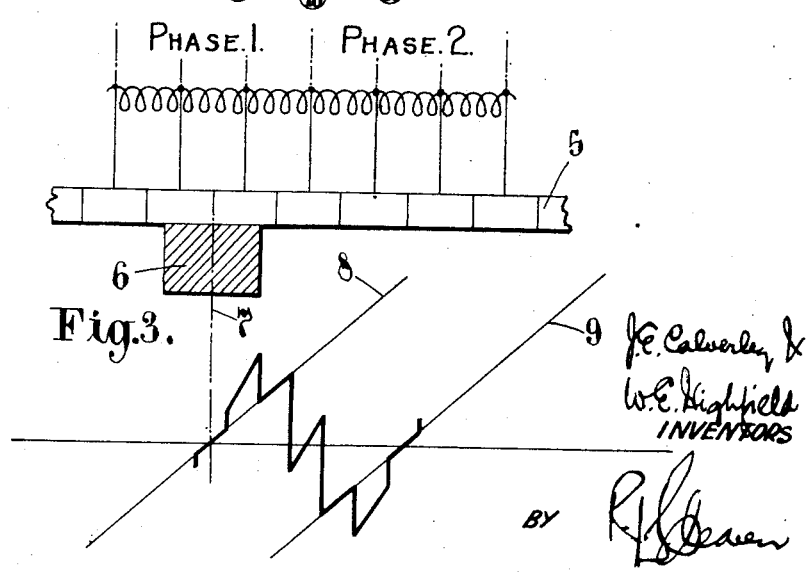

1,808,399

UNITED STATES PATENT OFFICE

JOHN EARNSHAW CALVERLEY, OF PRESTON, AND WILLIAM EDEN HIGHFIELD, OF LONDON, ENGLAND, ASSIGNORS TO THE ENGLISH ELECTRIC COMPANY LIMITED, OF LONDON, ENGLAND, A COMPANY OF GREAT BRITAIN

ELECTRIC CONVERTING APPARATUS

Application filed February 2, 1927, Serial No. 165,484, and in Great Britain February 27, 1926.

This invention relates to electric converting apparatus of the kind employing static transformers in conjunction with commutation gear, one of the sets of windings of the transformers (which we may for convenience refer to as the secondary set) forming a symmetrical closed ring winding of a relatively large number of phases, tappings being taken at regular intervals from this winding to the segments of the commutating gear in such a manner that consecutive tappings are connected directly to consecutive commutator segments.

In such apparatus as previously proposed and constructed, it has been found desirable for the purpose amongst others of obtaining good commutation conditions to make the secondary winding of a relatively large number of phases each containing an equal number of turns and in general to divide these phases into a number of sections by tappings leading to the commutator segments. In carrying out such a construction it has been natural to adopt an arrangement in which all the sections of one phase have been arranged on a single core of the transforming apparatus. It will be seen that with such an arrangement when a brush is in such a position on the commutator that it is in connection with a winding section at the end of a phase there will be a greater tendency to the production of sparking than at other points on the commutator because the voltage per section is highest at this stage in the commutation. This is one of the limiting factors in the design of this type of apparatus. It has been found that the influence of this factor may be considerably modified by providing a phase between each of the main phases of the secondary winding so as to arrange a section of the winding having an intermediate phase at the point of transition between the main phases of the secondary winding. This can be done very simply by arranging that the tappings from the closed ring winding are disposed so that they do not lie exactly at the junction between phases but are located a short distance on each side of this junction. Accordingly, at the transition point a section between the commutator segments comprises portions (preferably equal) lying in two phases.

The invention will be further discussed by reference to an example portions of which are shown diagrammatically in Figures 1 and 4 of the accompanying drawings. Reference will also be made to Figures 2 and 3 which are used to make clear a comparison between the new arrangement and the old arrangement in regard to one of the more important factors affecting commutation.

The form and disposition of the transformer cores and of the primary windings thereon forms no part of the present invention. It has, however, been assumed that the apparatus to which the invention is applied in the examples illustrated in the accompanying drawings has core and primary winding arrangements such as are illustrated and described in the specification of our United States Patent No. 1,567,032. These arrangements have also been described in technical journals under the name of "Transverter," see for instance, "Engineering" published in London, May 2nd, 1924. In this apparatus there are a number of three phase transformers having one set of windings (called the primary) supplied with alternating current from three phase mains, the windings being so distributed over the transformers as to produce phase differences between the fluxes in all of the cores. Each of these cores carries two secondary windings or sets of secondary windings which are connected in opposite senses into the closed ring formed by the secondary windings so that the two secondaries of each core provide two phases spaced apart by 180°. By this means the number of secondary phases is made twice the number of cores and the winding of each secondary phase is similar to all of the others and the spacing apart of the phases is uniform throughout 360 electrical degrees. In such apparatus a comparatively large number of secondary phases is found to be desirable. In the example described in the specification above mentioned and discussed hereinafter eighteen transformer cores are used, producing thirty six secondary phases These eighteen cores (not shown in the drawings accompanying the present case) are assumed to be numbered 1–18 and these numbers enclosed in circles and the same numbers with the index letter A are used in Figure 4 to indicate the secondary phase windings, each of which is located on the core the number of which it bears. For instance, phases 16 and 16A are located on the same core, namely No. 16.

It is to be understood that the numbers 1–18 enclosed in circles and applied to Figure 4 have the special significance above indicated and have no relation to the same numbers not enclosed in circles which are used as reference numerals in Figures 1, 2 and 3.

In the arrangement illustrated and described in the prior specification above mentioned, for convenience of illustration it has been assumed that the number of segments of the commutator is equal to the number of secondary phases, the connections to the commutator segments being brought out from the junctions between the terminals of the phases. In many cases, however, particularly where high voltages are concerned, it is important to sub-divide each phase into a number of sections and to make the segments of the commutator the corresponding multiple of the number of phases. This has been carried out hitherto by inserting between the commutator connections at the junctions of phases other commutator connections equally spaced apart on the winding of each phase. For instance, the secondary winding of each phase may consist of twelve turns divided into three sections. In the known method of connection there would be a tapping taken at each end of the section and there would be two intermediate tappings, thus dividing the phase into three equal sections each containing four turns.

In the diagram forming Figure 1 the connections to the commutator segments for only two of the secondary phases are shown. It will be understood, however, that what applies to these two phases applies in an exactly similar way to the other thirty-four phases which together make up the electrically symmetrical closed ring winding. This has been indicated diagrammatically in Figure 4 for a large number of the phases. In this diagram each phase winding is shown by a straight line having an arrow on it indicating the direction of current flow and for part of the ring each phase is shown divided up by three tappings connected directly to three segments of the commutator. The arrow inside the diagram indicates the direction in which the brushes are assumed to be moving past the commutator segments. Referring now to Figure 1, it will be seen that on each core 4 of the transformer structure is mounted a primary winding 15 and two secondary windings 16. Each secondary phase winding is assumed to consist of twelve turns as in the example just mentioned. In accordance with the new method illustrated in Figure 1 of the accompanying drawings there is no tapping leading from the end of a phase to the commutator but there is one tapping 1 at the middle of the phase and two others 2 and 3 at two turns from each end thereof, thus dividing up the phase into a half section of two turns followed by two sections of four turns and terminating in another half section of two turns. As the adjacent phases are similarly divided there is at the junction between the phases a section consisting of two groups of two turns, one group in one phase and the other group in the electrically adjacent phase so that the voltage between the tappings 3 and 2 at this point is in a phase intermediate between the two main secondary phases. It will accordingly be seen that by the present invention the tappings are all brought out from points on the secondary winding which are not the terminal points for the winding on any core, thus leaving in each main secondary phase a part of a section at each end of the winding carried by each core which part in conjunction with a similar part on another core forms a complete section of the secondary winding.

An appreciation of the improvement effected by the present invention may be realized by a consideration of Figures 2 and 3 which show in a particular example the voltage generated in the section or sections short circuited by a brush during the process of commutation. Figure 2 refers to the case of the present invention and Figure 3 to the arrangement previously in use, the number of phases and number of sections and turns per section being those which have been referred to in the discussion of Figure 1. The brush 6 which moves relative to the commutator segments 5 is taken as having a width equal to one and a half times the pitch of the segments. The upper part of the diagram in each case shows a development of the winding and the commutator and it is assumed that during the process of commutation the brush 6 moves along the segments 5. In the lower part of each diagram is shown a stepped line which indicates to an arbitrary scale in a vertical direction the value of the voltage which is being generated in the section or sections of the secondary winding which are short circuited by the brush during the commutation process. The position of the brush is indicated by the vertical projection of its centre line from the upper part of the diagram to the lower part. It will be noted that the position in which the brush is drawn corresponds to the instant at which the commutation process of phase 1 has been half completed. This position is projected by the line 7 to the lower part of the diagram. It has been assumed that at this instant the voltage generated in the secondary winding of phase 1 is zero. Since the brush 6 is assumed to move over the segments at a uniform rate, it is a simple matter to apply to the lower part of the diagrams lines indicating the way in which the voltage generated in each section of the phase under consideration varies for different positions of the centre line of the brush. Lines of this nature indicated by 8 and 9 are inserted in the diagram for the voltages in a section of phase 1 and phase 2 respectively. These are portions of sine curves which are identical with each other in shape and dimensions but are displaced horizontally from each other by ten electrical degrees. On Figure 2 there is also inserted a line 10 which represents the vector sum of the voltages generated in the two adjacent half sections of phases 1 and 2 which lie between tappings 3 and 2. This is also a sine curve cutting the horizontal axis half way between lines 8 and 9. Its amplitude should theoretically be somewhat less than that of the lines 8 and 9 but the difference is negligible in practice and indistinguishable at the scale to which the diagrams are drawn. By the aid of these lines 8, 9 and 10 and by observing the segments with which the brush is in contact when its centre line is at any particular position, it is a simple matter to construct the stepped lines in the lower part of each diagram. These lines form a standard of comparison and show that in the case of Figure 3, that is, the old arrangement, the amplitude of the voltage short circuited by the brush both as regards its maximum and its average values (neglecting sign) is about fifty per cent greater than in the case shown in Figure 2. It will therefore be evident that a very material improvement is effected by the present invention.

With the improvement above set forth either better commutation conditions can be obtained for a given number of cores or equivalent commutation conditions can be obtained with a reduced number of cores as compared with the previously known arrangements. The latter alternative is generally of the greater importance as affecting the cost of such converting apparatus.

What we claim as our invention and desire to secure by Letters Patent is:—

Electric converting apparatus comprising in combination a plurality of static transformers, windings on said transformers in the form of a polyphase electrically symmetrical closed ring, tappings from said windings an equal number of turns apart and located so that some of the turns at the adjacent ends of each phase winding lie between two consecutive tappings, a stationary commutator, and connections from consecutive tappings to consecutive sections of said commutator respectively.

In testimony whereof we affix our signatures.

JOHN EARNSHAW CALVERLEY.
WILLIAM EDEN HIGHFIELD.